(12) United States Patent
Kotcharov

(10) Patent No.: US 10,480,690 B2
(45) Date of Patent: Nov. 19, 2019

(54) FIBER REINFORCED THERMOPLASTIC HOSES AND METHODS FOR FORMING THE SAME

(71) Applicant: EATON CORPORATION, Cleveland, OH (US)

(72) Inventor: Sergey Y. Kotcharov, Okemos, MI (US)

(73) Assignee: Eaton Intelligent Power Limited, Dublin (IE)

( * ) Notice: Subject to any disclaimer, the term of this patent is extended or adjusted under 35 U.S.C. 154(b) by 125 days.

(21) Appl. No.: 15/693,541

(22) Filed: Sep. 1, 2017

(65) Prior Publication Data

US 2018/0073667 A1 Mar. 15, 2018

Related U.S. Application Data

(60) Provisional application No. 62/393,785, filed on Sep. 13, 2016.

(51) Int. Cl.
| | |
|---|---|
| *F16L 11/00* | (2006.01) |
| *F16L 11/08* | (2006.01) |
| *B32B 1/00* | (2006.01) |
| *F16L 11/127* | (2006.01) |
| *F16L 11/12* | (2006.01) |

(52) U.S. Cl.
CPC .............. *F16L 11/087* (2013.01); *B32B 1/00* (2013.01); *F16L 11/125* (2013.01); *F16L 11/127* (2013.01)

(58) Field of Classification Search
CPC ............................ F16L 11/087; F16L 11/125
USPC ................................. 138/123–127; 428/36.1
See application file for complete search history.

(56) References Cited

U.S. PATENT DOCUMENTS

| | | | | | |
|---|---|---|---|---|---|
| 4,384,595 | A * | 5/1983 | Washkewicz | ......... | F16L 11/082 138/124 |
| 5,361,806 | A * | 11/1994 | Lalikos | ................. | F16L 11/087 138/109 |
| 7,104,285 | B2 * | 9/2006 | Furuta | .................... | F16L 11/118 138/109 |
| 7,114,526 | B2 * | 10/2006 | Takagi | .................. | F16L 11/085 138/127 |
| 2014/0373962 | A1 * | 12/2014 | Lamontia | .............. | F16L 11/086 138/125 |
| 2016/0168767 | A1 * | 6/2016 | Bader | ...................... | D04B 1/22 442/60 |
| 2018/0172185 | A1 * | 6/2018 | Ishii | ......................... | B32B 5/24 |

\* cited by examiner

*Primary Examiner* — Patrick F Brinson
(74) *Attorney, Agent, or Firm* — Benesch Friedlander Coplan & Aronoff LLP (Eaton)

(57) ABSTRACT

A hose can include an inner tube that can form a flow path and an inner fiber layer that can be formed around an outer surface of the inner tube. The hose can further include an intermediate fiber layer that can be formed around the inner fiber layer, and an intermediate fiber layer that can be formed around the inner fiber layer. An outer layer can be formed around the intermediate fiber layer. The inner fiber layer, the intermediate fiber layer, and the outer fiber layer can be formed from support thread applied with greater than about 10 pounds (lbs) of tension. The support thread of the inner fiber layer, the support thread of the intermediate fiber layer, and the support thread of the outer fiber layer can include aramid fibers.

34 Claims, 5 Drawing Sheets

FIBER REINFORCED THERMOPLASTIC HOSES AND METHODS FOR FORMING THE SAME

CROSS REFERENCED TO RELATED APPLICATION

This application claims the benefit of U.S. Provisional Application No. 62/393,785, filed on Sep. 13, 2016 entitled "FIBER REINFORCED THERMOPLASTIC HOSES AND METHODS FOR FORMING THE SAME," the contents of which are herein incorporated by reference.

TECHNICAL FIELD

This disclosure generally relates to thermoplastic hoses for conveying fluid and, more specifically, to thermoplastic hoses for conveying hydraulic fluids, oil, and fuel.

BACKGROUND

Hoses can be utilized to provide a flexible mechanism for conveying fluid between two or more components. Thermoplastic hoses have many applications including industrial, hydraulic, and aircraft applications. For example, thermoplastic hoses can be utilized to convey pressurized fuel, oil, hydraulic fluid, or the like. Accordingly, the interior of thermoplastic hoses can be exposed to deleterious fluids at relatively high pressures. Additionally, thermoplastic hoses can be subjected to relatively hostile ambient conditions. Specifically, aircraft operation generally provides a relatively demanding ambient temperature range during normal operation due to use in a variety of climates and high altitude. For example, thermoplastic hoses can be subjected to high temperatures, when exposed to engine environments, and low temperatures, when exposed to high altitude.

The combined impact of the pressurized conveyed material and the ambient operating conditions can lead to weeping of fluid through the thermoplastic hoses. For example, stress cracks or so called micro-voids can form through a wall of the thermoplastic hose. While the thermoplastic hose may remain functional for conveying fluid, a portion of the fluid can exit the thermoplastic hose via the micro-voids formed in the wall. Thus, the micro-voids can lead to wetting or leakage of the fluid trough the hose wall and through any additional support layers. The leakage of fluid can cause hose assemblies to fail visual inspection and shorten the service of the hose assembly. Such shortened service life can lead to increased maintenance cost, in particular for the aircraft operator, and increased warranty expense for the manufacturer of the thermoplastic hose.

SUMMARY

In one example, a fiber reinforced thermoplastic hose can include an inner tube, an inner fiber layer, an intermediate fiber layer, and an outer fiber layer. The inner tube can form a flow path. The inner fiber layer can be formed around an outer surface of the inner tube. The intermediate fiber layer can be formed around the inner fiber layer. The outer fiber layer can be formed around the intermediate fiber layer. The inner fiber layer, the intermediate fiber layer, and the outer fiber layer can be formed from support thread applied with greater than about 10 pounds (lbs) of tension. The support thread of the inner fiber layer, the support thread of the intermediate fiber layer, and the support thread of the outer fiber layer can include aramid fibers.

In another example, a fiber reinforced thermoplastic hose can include an inner tube, an inner fiber layer, an intermediate fiber layer, and an outer fiber layer. The inner tube can form a flow path. The inner fiber layer can be formed around an outer surface of the inner tube. The intermediate fiber layer can be formed around the inner fiber layer. The outer fiber layer can be formed around the intermediate fiber layer. The inner fiber layer, the intermediate fiber layer, and the outer fiber layer can be formed from support thread having a nominal linear density, measured according to ASTM D1907, of less than about 2500 denier (den). The support thread of the inner fiber layer, the support thread of the intermediate fiber layer, and the support thread of the outer fiber layer can include aramid fibers.

In an even further example, a fiber reinforced thermoplastic hose can include an inner tube and one or more fiber reinforcement layers. The inner tube can form a flow path. The one or more fiber reinforcement layers can support the inner tube. The one or more fiber reinforcement layers cam be formed from support thread including aramid fibers. The inner tube can include micro-voids after 120 cycles between −65° Fahrenheit (F.) (about −54° Celsius (C.)) and about 275° F. (about 135° C.) at a static working pressure of 5080 pounds per square inch (psi). The maximum propagation of the micro-voids through the inner tube can be less than 80%.

In another example, a fiber reinforced thermoplastic hose can include an inner tube and one or more fiber reinforcement layers. The inner tube can form a flow path. The one or more fiber reinforcement layers can support the inner tube. The one or more fiber reinforcement layers cam be formed from support thread including aramid fibers. The inner tube can include micro-voids after 120 cycles between −65° F. (about −54° C.) and about 275° F. (about 135° C.) at a static working pressure of 5080 psi. Less than 25% of the micro-voids can propagate through greater than 50% of the inner tube.

According to any of the hoses provided herein, less than 5% of the micro-voids can propagate through greater than 75% of the inner tube after 120 cycles of thermal variation testing.

According to any of the hoses provided herein, a maximum propagation of the micro-voids through the inner tube can be less than 80% after 120 cycles of thermal variation testing.

Any of the hoses provided herein can include a fluid barrier layer formed around the outer fiber layer. Alternatively or additionally, the hoses provided herein can include a fiber cover braid formed around the fluid barrier layer.

According to any of the hoses provided herein, an area of coverage of the inner fiber layer, the intermediate fiber layer, and the outer fiber layer can be at least about 90%.

According to any of the hoses provided herein, the support thread of the outer fiber layer can have a nominal linear density, measured according to ASTM D1907, of less than about 2500 den. Alternatively or additionally, the support thread of the inner fiber layer can have a nominal linear density, measured according to ASTM D1907, of less than about 2500 den. Alternatively or additionally, the support thread of the intermediate fiber layer can have a nominal linear density, measured according to ASTM D1907, of less than about 2500 den.

According to any of the hoses provided herein, the support thread of the inner fiber layer, the support thread of the intermediate fiber layer, and the support thread of the outer fiber layer is formed as a single ply.

According to any of the hoses provided herein, the support thread of the inner fiber layer, the support thread of the intermediate fiber layer, and the support thread of the outer fiber layer can have a moisture regain, measured according to ASTM D1909, of less than about 10%.

According to any of the hoses provided herein, the support thread of the inner fiber layer, the support thread of the intermediate fiber layer, and the support thread of the outer fiber layer can have a nominal modulus, measured according to ASTM D7269, of greater than about 400 gpd.

According to any of the hoses provided herein, the support thread of the inner fiber layer can have a nominal breaking strength, measured according to ASTM D7269, between about 50 lbs and about 125 lbs.

According to any of the hoses provided herein, a percent difference of nominal breaking strength, measured according to ASTM D7269, between the support thread of the inner fiber layer, the support thread of the intermediate fiber layer, and the support thread of the outer fiber layer is less than about 25%.

According to any of the hoses provided herein, the support thread of the inner fiber layer can be applied at an inner layer angle. The support thread of the intermediate fiber layer can be applied at an intermediate layer angle. The support thread of the outer fiber layer can be applied at an outer layer angle. The inner layer angle can be greater than a neutral angle. The intermediate layer angle can be less than the neutral angle. The outer layer angle can be closer to the neutral angle than each of the inner layer angle and the intermediate layer angle.

BRIEF DESCRIPTION OF THE DRAWINGS

The examples set forth in the drawings are illustrative in nature and not intended to limit the subject matter defined by the claims. The following detailed description of the illustrative examples can be understood when read in conjunction with the following drawings, where like structure is indicated with like reference numerals and in which:

DETAILED DESCRIPTION

Figure 1:
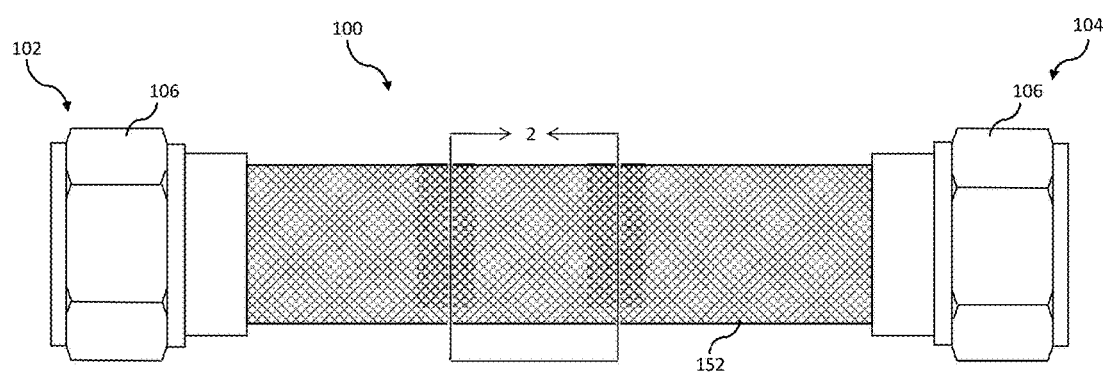
FIG. 1 illustrates an example of a fiber reinforced thermoplastic hose.
Figure 2:
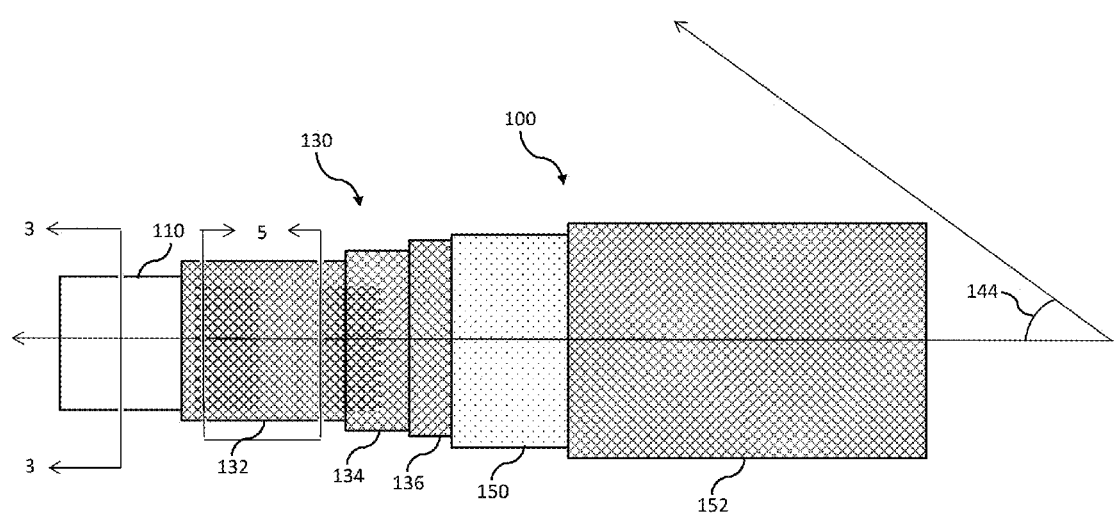
FIG. 2 illustrates an example of a partial cutaway view of a fiber reinforced thermoplastic hose of FIG. 1 taken at enlarged view 2.

FIGS. 1 and 2 illustrate an example of a fiber reinforced thermoplastic hose for conveying material between multiple components. The thermoplastic hose can include an inner tube for interfacing with the material, and one or more having one or more fiber reinforcement layers for supporting the inner tube. The fiber reinforcement layers can be configured and manufactured to mitigate micro-void formation and propagation through the wall of the inner tube. Various examples of the thermoplastic hose and methods for manufacturing the thermoplastic hose will be described in more detail herein.

FIG. 1 illustrates an example of a fiber reinforced thermoplastic hose 100 (or "hose"). The hose 100 can be configured for conveying pressurized fluids. The hose 100 can extend from a first end 102 to a second end 104. In some examples, the hose 100 can include a fitting 106 disposed at each of the first end 102 and the second end 104. Each fitting 106 can be configured to mate and form a fluid tight seal with another component such as, for example, within an aircraft. As an example, the hose 100 can be configured to convey pressurized fluid (e.g., Fuels, Hydraulic Oils and fluids, including Skydrol manufactured by Solutia Inc. of Town and Country, Mo., U.S.A., or the like) in aerospace applications. It is noted that, while the fitting 106 is depicted in FIG. 1 as being a straight socket with a nut coupling, the fitting 106 can be any suitable fitting for forming a fluid tight seal such as, for example, a fitting comprising an elbow, a tee, a cross, a nipple, a threaded connector, a snap connector, a flange, a brazed fitting, a welded fitting, swaged fitting, combinations thereof, or the like. For the purpose defining and describing the present disclosure, it is noted that the term "fluid" as used herein can mean a substance, such as a liquid or a gas, that is capable of flowing and that changes its shape when acted upon by a force tending to change its shape.

Figure 3:
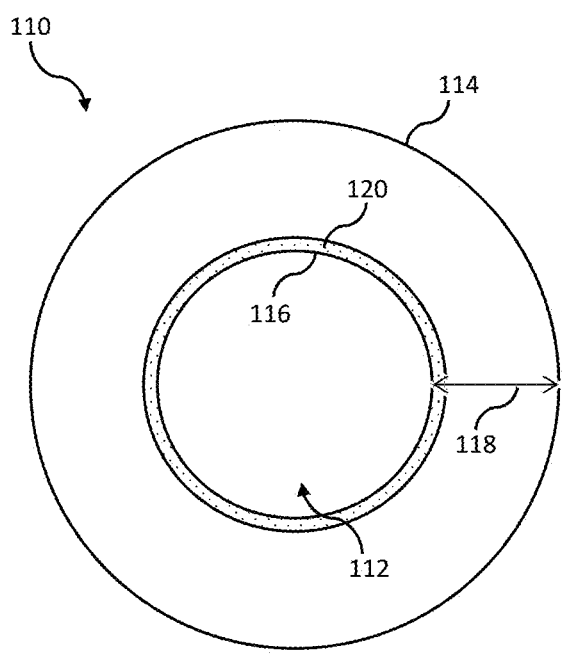
FIG. 3 illustrates an example of a cross sectional view of an inner tube of a fiber reinforced thermoplastic hose of FIG. 2.

Referring collectively to FIGS. 1, 2, and 3, the hose 100 can include an inner tube 110 that forms a flow path 112 for conveying fluid. Specifically, the inner tube 110 can form an inner surface 114 and an outer surface 116. The inner surface 114 can bound the flow path 112 and substantially contain fluid within the flow path 112. For example, the inner tube 110 can be formed as a mono or composite extruded tube. The inner surface 114 and the outer surface can bound a wall thickness 118 of the inner tube 110. It is noted that, while the inner tube 110 is depicted in FIGS. 2 and 3 as having a substantially circular cross section, the inner tube 110 can be formed using any shape suitable for defining a fluid flow path such as, but not limited to, substantially oval shaped cross section, polygonal (square, rectangle, etc.) shaped cross section, or the like.

The inner tube 110 can be formed from any thermoplastic material suitable for substantially containing fluid in the flow path 112 throughout the operating temperature range of an aircraft. For example, the ambient operating range can be between about −65° Fahrenheit (F.) (about −54° Celsius (C.)) and about 400° F. (about 204° C.). Suitable examples of thermoplastic materials include can include fluoropolymers and their compound formulations with otherfluoroelastomers, polymers, and elastomers. Specific examples include polytetrafluoroethylene (PTFE), ethylene tetrafluoroethylene (ETFE), fluorinated ethylene propylene (FEP), perfluoroalkoxy alkanes (PFA), blends thereof, or the like. As the thermoplastic material can be inherently non-conductive, the inner tube 110 can be provided as a non-conductive tube.

Alternatively, the inner tube 110 can be configured as a conductive tube. Accordingly, the inner tube 110 can be configured to promote the flow of electric current, for example, between the fittings 106, which can be electrically conductive. In some examples, the inner surface 116 can be formed from a conductive layer 120. The conductive layer 120 can be formed from a base material that is substantially the same as the material of inner tube 110. Electrically conductive bodies can be dispersed throughout the base material to improve the conductivity of the base material. The electrically conductive bodies can be formed from conductive materials such as, for example, silver, copper, nickel, carbon, nano-carbon, or the like.

Figure 4:
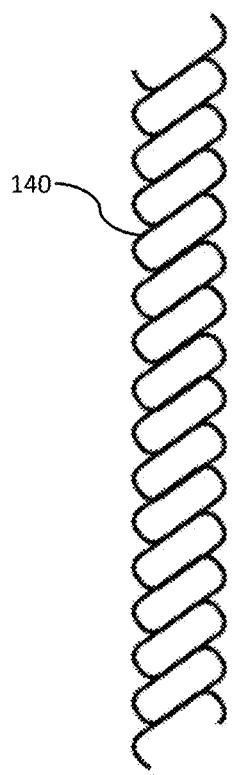
FIG. 4 illustrates an example of support fabric.

Referring collectively to FIGS. 2 and 4, the hose 100 can include one or more fiber reinforcement layers 130 for supporting the inner tube 110. For example, each of the fiber reinforcement layers 130 can be formed directly upon one another and around the inner tube 110 in successive structural layers. The mechanical properties of the fiber reinforcement layers 130 can be configured to control dimensional stability of the inner tube 110 during use. The fiber reinforcement layers 130 described herein have demonstrated the ability to mitigate radial expansion of examples of the inner tube 110 having a substantially circular cross sectional shape.

Each of the fiber reinforcement layers 130 can be formed by weaving a plurality of support threads 140 together to substantially surround an interior structure. Each support thread 140 can include a plurality of filaments that are spun or twisted together into a substantially cord-like shape. The filaments can be formed from durable fibers such as, for example, aramid fibers (e.g., meta-aramid fibers or para-aramid fibers). Suitable examples of the support thread 140 can include, but are not limited to, Technora® manufactured by Teijin Limited of Osaka, Japan, or Kevlar® manufactured by E. I. du Pont de Nemours and Company of Wilmington, Del., U.S.A.

The support thread 140 can be formed from one or more plies of thread that are spun or twisted together into a substantially cord-like shape such as, for instance, 1 ply in one example, or 2 plies in another example. An amount of empty spaces (e.g., pockets of air) in the fiber reinforcement layers 130 can be increased by increasing a number of plies provided in the support thread 140. By increasing the amount of spaces in the fiber reinforcement layers 130 can increase a tendency of the fiber reinforcement layers 130 to stretch and/or expand. The change in dimension can be measured as amount of change, rate of change, or both. Accordingly, in some examples, support thread 140 formed as a single ply of can be preferred over multi-ply fabric having the same measured properties.

According to the examples provided herein, the support thread 140 can be characterized by linear density. The linear density can be used to provide an indication of the thickness of thread. For example, the linear density can be expressed in units of denier (den) measured according to ASTM D1907. The nominal linear density of the support thread 140 can be correlated to the amount of interstitial space in the fiber reinforcement layers 130. Thus, a support thread 140 with a nominal density of less than about 2500 den can be preferred for use according to the present disclosure. The moisture regain of the support thread 140 can be expressed as a percentage measured according to ASTM D1909. In some examples, the moisture regain (commercial) of the support thread 140 forming the fiber reinforcement layers 130, measured according to ASTM D1909, can be less than about 10% such as, for instance, less than about 4% in one example, between about 2% and about 8% in another example, or about 3.5% in an even further example.

Figure 5:
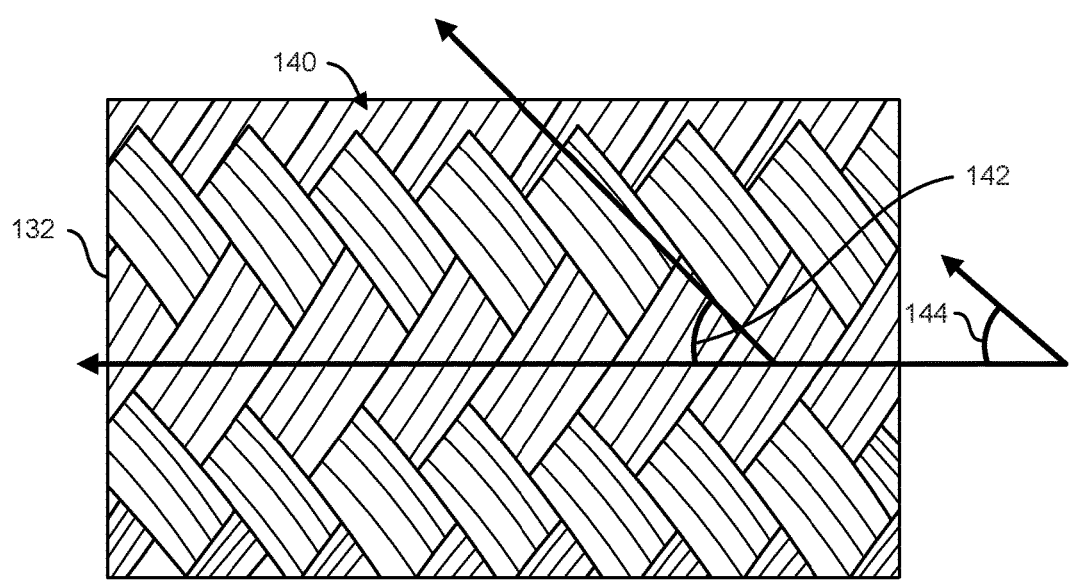
FIG. 5 illustrates an example of an enlarged view of an inner fiber layer of a fiber reinforced thermoplastic hose of FIG. 2.

Referring still to FIGS. 2, 4, and 5, the hose 100 can include an inner fiber layer 132 formed around the outer surface 116 of the inner tube 110. The inner fiber layer 132 can be configured to mostly cover the outer surface 116 of the inner tube 110, e.g., a majority of the surface area can be covered with support fabric 140. An area of coverage of the inner fiber layer 132 can be at least about 90% such as, for example, an area of coverage between about 90% and less than about 110% in one example, or an area of coverage between about 95% and about 105% in another example.

According to the examples provided herein, the inner fiber layer 132 can be applied with a braiding device. For example, the braiding device can be configured to receive the support thread 140 and braid or weave the support thread 140 as multiple carriers upon the inner tube 110 to form the inner fiber layer 132. The inner fiber layer 132 can be applied with an inner layer tension, i.e., the braiding device can apply tension to the carriers as they are weaved. The inner layer tension can be greater than about 10 pounds (lbs) of tension such as, for instance, greater than about 15 lbs of tension in one example. The support thread 140 can be applied at an inner layer angle 142. In some examples, the inner layer angle 142 can be offset from a neutral angle 144, e.g., greater than the neutral angle 144, or less than the neutral angle 144. Generally, the neutral angle 144 represents the angle the fiber reinforcement layer 130 moves towards when the inner tube 110 expands. Accordingly, when the inner layer angle 142 is greater than the neutral angle 144, expansion of the inner tube 110 can cause the inner fiber layer 132 shift to decrease the inner layer angle 142 towards the neutral angle 144. Likewise, when the inner layer angle 142 is less than the neutral angle 144, expansion of the inner tube 110 can cause the inner fiber layer 132 shift to increase the inner layer angle 142 towards the neutral angle 144.

The inner fiber layer 132 can be formed from support thread 140 having a nominal linear density, measured according to ASTM D1907, of less than about 2500 den such as for instance, less than about 2000 den in one example, less than or equal to about 1500 denier in another example, about 1500 den in yet another example, about 1200 den in a further example, or about 800 den in an additional example. The modulus of the support thread 140 can be indicative of the resistance of the support thread 140 to a force tending to extend the support thread 140. For example, the modulus can be expressed in units of gpd measured according to ASTM D7269. The inner fiber layer 132 can be formed from support thread 140 having a nominal modulus, measured according to ASTM D7269, of greater than about 400 gpd such as, for instance, between about 450 gsm and about 875 gsm in one example, greater than about 500 gpd in another example, or greater than about 550 gpd in a further example.

The breaking strength of the support thread 140 can be indicative of the amount of force needed to pull the support thread 140 apart. For example, the breaking strength can be expressed in units of lbs measured according to ASTM D7269. The inner fiber layer 132 can be formed from support thread 140 having a nominal breaking strength, measured according to ASTM D7269, between about 50 lbs and about 125 lbs such as, for instance, between about 55 lbs and about 115 lbs in one example, between about 70 lbs and about 100 lbs in another example, or between about 75 lbs and about 95 lbs in an even further example.

Referring collectively to FIGS. 2 and 4, the hose 100 can include an intermediate fiber layer 134 formed around the inner fiber layer 132. The intermediate fiber layer 134 can be configured to mostly cover the inner fiber layer 132. An area of coverage of the intermediate fiber layer 134 can be at least about 90% such as, for instance, an area of coverage between about 90% and less than about 110% in one example, or an area of coverage between about 95% and about 105% in another example. The intermediate fiber layer 134 can be applied with an intermediate layer tension of greater than about 10 lbs of tension such as, for instance, greater than about 15 lbs of tension in one example, about 16 lbs of tension in another example, or about 20 lbs of tension in an even further example.

The intermediate fiber layer 134 can be formed from support thread 140 applied at an intermediate layer angle. The intermediate layer angle can be offset from the neutral angle 144. In some instances, the intermediate layer angle can be offset on the opposite side of the neutral angle 144 as the inner layer angle 142 (FIG. 5). For example, when the inner layer angle 142 is greater than the neutral angle 144, the intermediate layer angle can be less than the neutral angle. It is noted that, while the neutral angle 144 is depicted as being the same for all of the fiber reinforcement layers 130, each of the of the fiber reinforcement layers 130 can have a distinct neutral angle.

The intermediate fiber layer 134 can be formed from support thread 140 having a nominal linear density, measured according to ASTM D1907, of less than about 2500 den such as for instance, less than about 2000 den in one example, less than or equal to about 1500 denier in another example, about 1500 den in yet another example, about 1200 den in a further example, or about 800 den in an additional example. Alternatively or additionally, the intermediate fiber layer 134 can be formed from support thread 140 having a nominal modulus, measured according to ASTM D7269, of greater than about 400 gpd such as, for instance, between about 450 gsm and about 875 gsm in one example, greater than about 500 gpd in another example, or greater than about 550 gpd in a further example. Alternatively or additionally, the intermediate fiber layer 134 can be formed from support thread 140 having a nominal breaking strength, measured according to ASTM D7269, between about 50 lbs and about 125 lbs such as, for instance, between about 60 lbs and about 115 lbs in one example, between about 70 lbs and about 100 lbs in another example, or between about 75 lbs and about 95 lbs in a further example.

Referring still to FIGS. 2 and 4, the hose 100 can include an outer fiber layer 136 formed around the intermediate fiber layer 134. The outer fiber layer 136 can be configured to mostly cover the intermediate fiber layer 134. In some examples, an area of coverage provided by the outer fiber layer 136 can be at least about 90% such as, for instance, an area of coverage between about 90% and less than about 110% in one example, or an area of coverage between about 95% and about 105% in another example. The outer fiber layer 136 can be applied with an outer layer tension of greater than about 10 lbs of tension such as, for instance, greater than about 15 lbs of tension in one example, about 16 lbs of tension in another example, or about 20 lbs of tension in another example.

The outer fiber layer 136 can be formed from support thread 140 applied at an outer layer angle. In some examples, the outer layer angle can be closer to the neutral angle 144 than each of the inner layer angle 142 (FIG. 5) and the intermediate layer angle. For example, the magnitude of the offset of the outer layer angle from the neutral angle 144 can be less than the magnitude of the offset of the inner layer angle 142 from the neutral layer angle 144 and can be less than the magnitude of the offset of the intermediate layer angle from the neutral layer angle 144. Accordingly, the outer fiber layer 136 can be configured to move less than the inner fiber layer 132 and the intermediate fiber layer 134, as the inner tube 110 expands.

The outer fiber layer 136 can be formed from support thread 140 having a nominal linear density, measured according to ASTM D1907, of less than about 2500 den such as for instance, less than about 2000 den in one example, less than or equal to about 1500 denier in another example, about 1500 den in yet another example, about 1200 den in a further example, or about 800 den in an additional example. Alternatively or additionally, the outer fiber layer 136 can be formed from support thread 140 having a nominal modulus, measured according to ASTM D7269, of greater than about 450 gpd such as, for instance, between about 470 gsm and about 1,125 gsm in one example, greater than about 550 gpd in another example, or greater than about 575 gpd in a further example. Alternatively or additionally, the outer fiber layer 136 can be formed from support thread 140 having a nominal breaking strength, measured according to ASTM D7269, between about 55 lbs and about 100 lbs such as, for instance, between about 60 lbs and about 95 lbs in one example, or between about 70 lbs and about 90 lbs in another example.

Referring collectively to FIGS. 1 and 2, the hose 100 can include a fluid barrier layer 150 formed around the outer fiber layer 136. The fluid barrier layer 150 can be configured to mitigate the introduction of fluid into the fiber reinforcement layers 130. In some examples, the fluid barrier layer 150 can be formed from a thermoplastic material. For example, the fluid barrier layer 150 can be formed by applying thermoplastic tape (e.g., PTFE tape, or PET tape) over the outer fiber layer 136 in overlapping spirals.

The hose 100 can include a fiber cover braid 152 formed around the fluid barrier layer 150. The fiber cover braid 152 can be configured to protect the mechanical performance of the fiber reinforcement layers 130. The fiber cover braid 152 can be formed from high temperature thread, which can include a meta-aramid such as, but not limited to, Polybenzimidazole (PBI). The fiber cover braid 152 can be applied with a braiding device, as described herein with respect to the fiber reinforcement layers 130. The fiber cover braid 152 can be applied with an cover tension. In some examples, the cover tension can be less than each of the inner layer tension, the intermediate layer tension, and the outer layer tension. The cover tension can be less than about 10 lbs of tension such as, for instance, greater than about 7.5 lbs of tension in an example.

Hoses of the present disclosure were subjected to a number of cycles of a thermal variation testing. Specifically, size −10 hoses were fabricated according to the examples provided herein. The tested hoses were filled with hydraulic fluid at static working pressure of 5080 pounds per square inch (psi), and cycled between −65° F. (about −54° C.) and about 275° F. (about 135° C.). During the test, the tested hoses were mounted at the minimum bend radius recommended for the hose. The ambient temperature of the was brought to the high temperature and held for two hours. At the end of the two hours the temperature was reduced to the low temperature and maintained for two hours to complete a single cycle. After the testing was complete, the hoses were drained of the hydraulic fluid and the inner tube 110 was extracted. Cross-sections of the inner tube 110 of the tested hoses were inspected for micro-voids. The fiber reinforcement layers 130 of the Comparative Example were applied with 7.5 lbs of tension. The fiber reinforcement layers 130 of the remaining hoses were applied with 20 lbs of tension. Additional properties of the fiber reinforcement layers 130 of the tested hoses are summarized below in Table 1, Table 2, and Table 3.

TABLE 1

|  | Inner Layer ASTM D1907 Nominal Linear Density (den) | Intermediate Layer ASTM D1907 Nominal Linear Density (den) | Outer Layer Nominal ASTM D1907 Linear Density (den) |
| --- | --- | --- | --- |
| Comparative Example | 3,000 | 3,000 | 1,500 |
| High Tension | 3,000 | 3,000 | 1,500 |

TABLE 1-continued

|  | Inner Layer ASTM D1907 Nominal Linear Density (den) | Intermediate Layer ASTM D1907 Nominal Linear Density (den) | Outer Layer Nominal ASTM D1907 Linear Density (den) |
|---|---|---|---|
| Embodiment |  |  |  |
| Embodiment 2 | 1,200 | 1,500 | 1,420 |
| Embodiment 3 | 1,200 | 1,500 | 1,500 |
| Embodiment 4 | 1,500 | 1,500 | 1,500 |
| Embodiment 5 | 1,500 | 1,500 | 1,420 |
| Embodiment 13 | 1,500 | 1,500 | 1,420 |
| Embodiment 15 | 1,500 | 1,500 | 1,420 |
| Embodiment 17 | 1,500 | 1,500 | 1,420 |

TABLE 2

|  | Inner Layer ASTM D7269 Nominal Breaking Strength (lbs) | Intermediate Layer ASTM D7269 Nominal Breaking Strength (lbs) | Outer Layer Nominal ASTM D7269 Nominal Breaking Strength (lbs) | Percent Difference between minimum and maximum |
|---|---|---|---|---|
| Comparative Example | 151.3 | 151.3 | 76.1 | 98.8% |
| High Tension Embodiment | 151.3 | 151.3 | 76.1 | 98.8% |
| Embodiment 2 | 73 | 76.1 | 76.2 | 4.4% |
| Embodiment 3 | 73 | 76.1 | 76.2 | 4.4% |
| Embodiment 4 | 76.1 | 76.1 | 76.1 | 0% |
| Embodiment 5 | 76.1 | 76.1 | 76.2 | 0.1% |
| Embodiment 13 | 91.9 | 91.9 | 76.2 | 20.6% |
| Embodiment 15 | 91.9 | 86 | 76.2 | 20.6% |
| Embodiment 17 | 91.9 | 91.9 | 76.2 | 20.6% |

TABLE 3

|  | Inner Layer ASTM D7269 Nominal Modulus (gpd) | Intermediate Layer ASTM D7269 Nominal Modulus (gpd) | Outer Layer Nominal ASTM D7269 Nominal Modulus (gpd) |
|---|---|---|---|
| Comparative Example | 570 | 570 | 590 |
| High Tension Embodiment | 570 | 570 | 590 |
| Embodiment 2 | 725 | 590 | 940 |
| Embodiment 3 | 725 | 590 | 940 |
| Embodiment 4 | 590 | 590 | 590 |
| Embodiment 5 | 590 | 590 | 940 |
| Embodiment 13 | 570.4 | 570.4 | 940 |
| Embodiment 15 | 570.4 | 600 | 940 |
| Embodiment 17 | 570.4 | 570.4 | 940 |

Comparative Example, High Tension Embodiment, Embodiment 2, Embodiment 3, Embodiment 4, and Embodiment 5 were tested for 20 cycles. After 20 cycles of testing, cross sections of the tested hoses were examined tested for micro-voids using fluorescent penetrant. The results of the testing are summarized below in Table 4 and Table 5.

TABLE 4

|  | Propagation Through Wall | | Propagation Through Wall | | Std. Dev. (%) |
|---|---|---|---|---|---|
|  | Mean | Reduction | Max | Reduction |  |
| Comparative Example | 17.73% | — | 70.00 | — | 9.55% |
| High Tension Embodiment | 11.15% | 37% | 24.06 | 66% | 4.01% |
| Embodiment 2 | 7.96% | 55% | 10.75 | 85% | 1.90% |
| Embodiment 3 | 8.53% | 52% | 13.69 | 80% | 1.96% |
| Embodiment 4 | 10.84% | 39% | 22.75 | 68% | 2.82% |
| Embodiment 5 | 10.35% | 42% | 13.57 | 81% | 1.77% |

TABLE 5

|  | Percent of Micro-voids Observed between 5% penetration and 10% penetration | Percent of Micro-voids Observed between 10% penetration and 15% penetration | Percent of Micro-voids Observed between 15% penetration and 20% penetration | Percent of Micro-voids Observed between 20% penetration and 25% penetration |
|---|---|---|---|---|
| Embodiment 2 | 80% | 20% | 0% | 0% |
| Embodiment 3 | 81% | 19% | 0% | 0% |
| Embodiment 4 | 45% | 50% | 0% | 5% |
| Embodiment 5 | 71% | 29% | 0% | 0% |

Embodiment 2, Embodiment 3, Embodiment 4, and Embodiment 5 demonstrated good performance after 20 cycles of testing. Each of Embodiment 2, Embodiment 3, Embodiment 4, and Embodiment 5 had an average propagation of less than about 11% and a maximum of less than about 24%. Each of the hoses tested for 20 cycles, had a relatively small percent difference of nominal breaking strength, measured according to ASTM D7269, between the support thread 140 of the fiber reinforcement layers 130. The difference of nominal breaking strength was less than about 25% such as, for example, less than about 5% in some examples.

Comparative Example, the High Tension Embodiment, Embodiment 5, Embodiment 13, Embodiment 15, and Embodiment 17 were tested for 120 cycles. After 120 cycles of testing, cross sections of the tested hoses were tested for micro-voids using fluorescent penetrant. The results of the testing are summarized below in Table 6 and Table 7.

TABLE 6

|  | Propagation Through Wall | | Propagation Through Wall | | Std. Dev. |
|---|---|---|---|---|---|
|  | Mean | Reduction | Max | Reduction |  |
| Comparative Example | 33.37% | — | 100% | — | 27.60% |
| High Tension Embodiment | 19.90% | 40% | 74.79% | 25% | 13.50% |
| Embodiment 2 | 12.15% | 64% | 57.49% | 43% | 7.83% |
| Embodiment 5 | 30.16% | 10% | 47.43% | 53% | 11.60% |
| Embodiment 13 | 19.32% | 42% | 59.9% | 40% | 7.59% |
| Embodiment 15 | 27.19% | 19% | 73.3% | 27% | 15.29% |
| Embodiment 17 | 20.50% | 39% | 78.35% | 22% | 13.16% |

TABLE 7

| | Percent of Micro-voids Observed between 0% penetration and 25% penetration | Percent of Micro-voids Observed between 25% penetration and 50% penetration | Percent of Micro-voids Observed between 50% penetration and 75% penetration | Percent of Micro-voids Observed between 75% penetration and 100% penetration |
|---|---|---|---|---|
| Comparative Example | 39% | 21% | 21% | 19% |
| High Tension Embodiment | 58% | 25% | 15% | 3% |
| Embodiment 5 | 40% | 60% | 0% | 0% |
| Embodiment 13 | 76% | 21% | 3% | 0% |
| Embodiment 15 | 57% | 29% | 14% | 0% |
| Embodiment 17 | 56% | 32% | 9% | 3% |

Each of the High Tension Embodiment, Embodiment 5, Embodiment 13, Embodiment 15, and Embodiment 17 demonstrated improved performance over the Comparative Example. It is noted that the amount of propagation of the micro-voids through the inner tube 110 can be correlated to weeping. For example, the amount of weeping can increase with increased amount of propagation. The maximum propagation of the micro-voids through the inner tube 110 was less than 80% for each of the High Tension Embodiment, Embodiment 5, Embodiment 13, Embodiment 15, and Embodiment 17, and in some embodiments less than about 60%.

Additionally, for the High Tension Embodiment, Embodiment 5, Embodiment 13, Embodiment 15, and Embodiment 17 the number of micro-voids propagating beyond 50% of the inner tube 110 was less than about 25% of the observed micro-voids such as, for instance, less than 15% in some examples, and less than about 5% in further examples. The number of micro-voids propagating beyond 75% of the inner tube 110 was less than about 5%.

It should now be understood that examples provided herein related to improved fiber reinforced hoses, which have increased protection against weeping. For instance, the construction and mechanical properties of the fiber reinforcement layers can be controlled to reduce the number of micro-voids, and to mitigate the propagation of micro-voids through the inner tube of the fiber reinforced hoses. In some examples, the hose construction, design, and manufacturing techniques described herein can be used to reduce stress cracking in PTFE for para-aramid reinforced PTFE aerospace hydraulic hoses. Thus, the service life and reliability of aerospace hydraulic hoses can be improved to reduce warranty and maintenance expenses.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular examples have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A hose, comprising:
   an inner tube that forms a flow path;
   an inner fiber layer formed around an outer surface of the inner tube;
   an intermediate fiber layer formed around the inner fiber layer; and
   an outer fiber layer formed around the intermediate fiber layer;
   wherein the inner fiber layer, the intermediate fiber layer, and the outer fiber layer are formed of support thread;
   wherein each of the inner fiber layer, the intermediate fiber layer, and the outer fiber layer comprises support thread under tension greater than about 10 pounds (lbs);
   wherein the support thread of the inner fiber layer, the support thread of the intermediate fiber layer, and the support thread of the outer fiber layer comprises aramid fibers; and
   wherein the support thread of the inner fiber layer, the support thread of the intermediate fiber layer, and the support thread of the outer fiber layer has a nominal modulus, measured according to ASTM D7269, of greater than about 400 gpd.

2. The hose of claim 1, further comprising a fluid barrier layer formed around the outer fiber layer.

3. The hose of claim 2, further comprising a fiber cover braid formed around the fluid barrier layer.

4. The hose of claim 1, wherein an area of coverage of the inner fiber layer, the intermediate fiber layer, and the outer fiber layer is at least about 90%.

5. The hose of claim 1, wherein the support thread of the outer fiber layer has a nominal linear density, measured according to ASTM D1907, of less than about 2500 denier (den).

6. The hose of claim 5, wherein the support thread of the inner fiber layer has a nominal linear density, measured according to ASTM D1907, of less than about 2500 den.

7. The hose of claim 5, wherein the support thread of the intermediate fiber layer has a nominal linear density, measured according to ASTM D1907, of less than about 2500 den.

8. The hose of claim 1, wherein the support thread of the inner fiber layer, the support thread of the intermediate fiber layer, and the support thread of the outer fiber layer is formed as a single ply.

9. The hose of claim 1, wherein the support thread of the inner fiber layer, the support thread of the intermediate fiber layer, and the support thread of the outer fiber layer has a moisture regain, measured according to ASTM D1909, of less than about 10%.

10. The hose of claim 1, wherein the support thread of the inner fiber layer has a nominal breaking strength, measured according to ASTM D7269, between about 50 pounds (lbs) and about 125 lbs.

11. The hose of claim 1, wherein a percent difference of nominal breaking strength, measured according to ASTM D7269, between the support thread of the inner fiber layer, the support thread of the intermediate fiber layer, and the support thread of the outer fiber layer is less than about 25%.

12. The hose of claim 1, wherein:
   the support thread of the inner fiber layer is applied at an inner layer angle;
   the support thread of the intermediate fiber layer is applied at an intermediate layer angle;
   the support thread of the outer fiber layer is applied at an outer layer angle;
   the inner layer angle is greater than a neutral angle;

the intermediate layer angle is less than the neutral angle; and the outer layer angle is closer to the neutral angle than each of the inner layer angle and the intermediate layer angle.

13. The hose of claim 1, wherein:
the support thread of the inner fiber layer is applied at an inner layer angle;
the support thread of the intermediate fiber layer is applied at an intermediate layer angle;
the support thread of the outer fiber layer is applied at an outer layer angle;
the inner layer angle is less than a neutral angle;
the intermediate layer angle is greater than the neutral angle; and
the outer layer angle is closer to the neutral angle than each of the inner layer angle and the intermediate layer angle.

14. A hose, comprising:
an inner tube that forms a flow path;
an inner fiber layer formed around an outer surface of the inner tube;
an intermediate fiber layer formed around the inner fiber layer; and
an outer fiber layer formed around the intermediate fiber layer;
wherein the inner fiber layer, the intermediate fiber layer, and the outer fiber layer are formed from support thread having a nominal linear density, measured according to ASTM D1907, of less than about 2500 denier (den);
wherein the support thread of the inner fiber layer, the support thread of the intermediate fiber layer, and the support thread of the outer fiber layer comprises aramid fibers; and
wherein each of the inner fiber layer, the intermediate fiber layer, and the outer fiber layer comprises support thread under tension greater than about 10 pounds (lbs).

15. The hose of claim 14, wherein the support thread of the inner fiber layer, the support thread of the intermediate fiber layer, and the support thread of the outer fiber layer is formed as a single ply.

16. The hose of claim 14, wherein the support thread of the inner fiber layer, the support thread of the intermediate fiber layer, and the support thread of the outer fiber layer has a moisture regain, measured according to ASTM D1909, of less than about 10%.

17. The hose of claim 14, wherein the support thread of the inner fiber layer has a nominal breaking strength, measured according to ASTM D7269, between about 50 pounds (lbs) and about 125 lbs.

18. The hose of claim 14, wherein a percent difference of nominal breaking strength, measured according to ASTM D7269, between the support thread of the inner fiber layer, the support thread of the intermediate fiber layer, and the support thread of the outer fiber layer is less than about 25%.

19. A hose, comprising:
an inner tube that forms a flow path; and
one or more fiber reinforcement layers that support the inner tube, wherein:
the one or more fiber reinforcement layers is formed from support thread comprising aramid fibers;
the inner tube comprises micro-voids after 120 cycles between −65° Fahrenheit (F.) (about −54° Celsius (C.)) and about 275° F. (about 135° C.) at a static working pressure of 5080 pounds per square inch (psi);
a maximum propagation of the micro-voids through the inner tube is less than 80%.

20. The hose of claim 19, wherein less than 5% of the micro-voids propagate through greater than 75% of the inner tube.

21. A hose, comprising:
an inner tube that forms a flow path; and
one or more fiber reinforcement layers that support the inner tube, wherein:
the one or more fiber reinforcement layers is formed from support thread comprising aramid fibers;
the inner tube comprises micro-voids after 120 cycles between −65° Fahrenheit (F.) (about −54° Celsius (C.)) and about 275° F. (about 135° C.) at a static working pressure of 5080 psi;
less than 25% of the micro-voids propagate through greater than 50% of the inner tube.

22. The hose of claim 21, wherein a maximum propagation of the micro-voids through the inner tube is less than 80%.

23. The hose of claim 19, wherein less than 25% of the micro-voids propagate through greater than 50% of the inner tube.

24. The hose of claim 20, wherein less than 25% of the micro-voids propagate through greater than 50% of the inner tube.

25. The hose of claim 21, wherein less than 5% of the micro-voids propagate through greater than 75% of the inner tube.

26. The hose of claim 22, wherein less than 5% of the micro-voids propagate through greater than 75% of the inner tube.

27. The hose of claim 1, wherein the inner fiber layer comprises support thread under tension greater than about 15 pounds (lbs).

28. The hose of claim 27, wherein the inner fiber layer comprises support thread under tension of about 20 pounds (lbs).

29. The hose of claim 1, wherein each of the inner fiber layer, the intermediate fiber layer, and the outer fiber layer comprises support thread under tension greater than about 15 pounds (lbs).

30. The hose of claim 29, wherein each of the inner fiber layer, the intermediate fiber layer, and the outer fiber layer comprises support thread under tension of about 20 pounds (lbs).

31. The hose of claim 14, wherein the inner fiber layer comprises support thread under tension greater than about 15 pounds (lbs).

32. The hose of claim 31, wherein the inner fiber layer comprises support thread under tension of about 20 pounds (lbs).

33. The hose of claim 14, wherein each of the inner fiber layer, the intermediate fiber layer, and the outer fiber layer comprises support thread under tension greater than about 15 pounds (lbs).

34. The hose of claim 33, wherein each of the inner fiber layer, the intermediate fiber layer, and the outer fiber layer comprises support thread under tension greater than about 20 pounds (lbs).

* * * * *